United States Patent
Juhlin-Dannfelt

(10) Patent No.: US 8,849,529 B2
(45) Date of Patent: Sep. 30, 2014

(54) METHOD AND SYSTEM FOR DETERMINING THE CONTACT POINT FOR A CLUTCH IN A VEHICLE

(75) Inventor: Peter Juhlin-Dannfelt, Hägersten (SE)

(73) Assignee: Scania CV AB (SE)

( * ) Notice: Subject to any disclaimer, the term of this patent is extended or adjusted under 35 U.S.C. 154(b) by 423 days.

(21) Appl. No.: 13/391,709

(22) PCT Filed: Sep. 13, 2010

(86) PCT No.: PCT/SE2010/050969
§ 371 (c)(1),
(2), (4) Date: Feb. 22, 2012

(87) PCT Pub. No.: WO2011/034488
PCT Pub. Date: Mar. 24, 2011

(65) Prior Publication Data
US 2012/0150403 A1 Jun. 14, 2012

(30) Foreign Application Priority Data

Sep. 14, 2009 (SE) ........................ 0950663

(51) Int. Cl.
*F16D 48/06* (2006.01)
(52) U.S. Cl.
CPC ...... *F16D 48/06* (2013.01); *F16D 2500/50272* (2013.01); *F16D 2500/50669* (2013.01); *F16D 2500/50251* (2013.01); *F16D 2500/30425* (2013.01); *F16D 2500/50236* (2013.01)
USPC ............................................. 701/67; 477/174
(58) Field of Classification Search
USPC ................................. 701/67, 68; 477/166–181
See application file for complete search history.

(56) References Cited

U.S. PATENT DOCUMENTS

| | | | | |
|---|---|---|---|---|
| 4,503,734 A | * | 3/1985 | Acker | 701/67 |
| 5,393,274 A | * | 2/1995 | Smedley | 477/74 |
| 6,711,486 B1 | * | 3/2004 | Karlsson et al. | 701/67 |
| 2008/0305931 A1 | * | 12/2008 | Eich et al. | 477/174 |
| 2012/0109473 A1 | * | 5/2012 | Hodrus et al. | 701/51 |
| 2014/0136064 A1 | * | 5/2014 | Baek et al. | 701/68 |

FOREIGN PATENT DOCUMENTS

EP    1 741 950 A1    1/2007

OTHER PUBLICATIONS

International Search Report dated Jan. 1, 2011, issued in corresponding international application No. PCT/SE2010/050969.

* cited by examiner

*Primary Examiner* — Khoi Tran
*Assistant Examiner* — Adam Mott
(74) *Attorney, Agent, or Firm* — Ostrolenk Faber LLP

(57) ABSTRACT

A method for determining the contact point for a clutch in a vehicle comprising an engine, a clutch, powered wheels and a gearbox. The gearbox has a first gearbox component which is connected to the clutch and disconnectable from the powered wheels. The method steps include estimating (405) a friction torque for the first gearbox component, whereby the torque transmitted by the clutch is a function of estimated friction torque, closing (407) the clutch, whereby a representation of a torque transmitted by the clutch is determined for a plurality of positions for the clutch, determining (409) the contact point by means of the determined representation of torque transmitted, and the further step (402), before the closure of the clutch, of accelerating the first gearbox component if its rotation speed is below a certain value. Also a system and a vehicle for performing the method are disclosed.

10 Claims, 5 Drawing Sheets

METHOD AND SYSTEM FOR DETERMINING THE CONTACT POINT FOR A CLUTCH IN A VEHICLE

CROSS-REFERENCE TO RELATED APPLICATIONS

The present application is a 35 U.S.C. §§371 national phase conversion of PCT/SE2010/050969, filed Sep. 13, 2010, which claims priority of Swedish Application No. 0950663-5, filed Sep. 14, 2009, the contents of which are incorporated by reference herein. The PCT International Application was published in the English language.

FIELD OF THE INVENTION

The present invention relates to vehicles with an automatically controlled clutch and in particular to a method for determining the clutch's contact point. The invention relates also to a system and a vehicle which perform the method.

BACKGROUND TO THE INVENTION

With regard to vehicles in general, many different power train configurations are available. For example, the gearbox may take the form of a manually operated gearbox or an automatic gearbox. With regard to heavy vehicles, it is often desirable that they should provide the driver with as comfortable a driving experience as possible. This means, for example, that the gear changes in the gearbox should be executed automatically by a control system usually incorporated in the vehicle. Automatically operated gearboxes have therefore become increasingly common in heavy vehicles.

However, this automatic gear changing is usually not executed by an automatic gearbox in the traditional sense, but by control system operation of a "manual" gearbox, partly because manual gearboxes are substantially less expensive to manufacture, but also because they are usually more efficient. With regard to automatic gearboxes of the type commonly used in passenger cars, the level of efficiency is often too low compared with a manually operated gearbox to justify their use other than in, for example, local buses and delivery vehicles in urban areas where frequent starting and stopping is usually required.

With regard to heavy vehicles largely used on major roads/motorways, automatically operated "manual" gearboxes are therefore commonly used.

This gear changing may be effected in several different ways, in one of which a clutch pedal is used to set the vehicle in motion from stationary but all other gear changing can be effected by the vehicle's control system without involving the clutch at all. Instead, the gear changes are carried out "torque-free", i.e. the torque delivered from the engine is adjusted to a suitable level to reduce the torque transmitted at the engagement points of the relevant gears.

Another method is to use instead an automatically controlled clutch with automatic upshifts and downshifts, in which case the driver has access to only an accelerator pedal and a brake pedal.

On this type of vehicle with an automatic clutch, it is however important to feel the clutch's contact point, i.e. the position at which the clutch begins to transmit torque. The contact point is not a fixed point, but varies, mainly depending on the clutch's temperature, but also on other factors. The contact point may therefore change when the vehicle is in motion, resulting in a need to be able to estimate the contact point's position at regular intervals when the vehicle is in motion.

By feeling the contact point's position, e.g. when setting in motion or halting the vehicle or changing gear, the vehicle's control system therefore recognises the clutch position at which torque transmission from the engine to the rest of the power train begins or ceases, so that setting the vehicle in motion and gear changing can also be carried out in such a way as not to cause unwanted jerking or unwanted wear in the power train.

Estimation of the contact point's position should take place when the gearbox is in neutral position if the vehicle is not to be affected by the estimation. An example of how this can be carried out is by maneuvering the clutch from open position to closed position while the gearbox input shaft is stationary. The contact point is then determined as the first position at which a rotation speed sensor on the gearbox input shaft registers a speed.

A problem with this type of contact point estimation is that the time it takes may be too long for it to be unnoticed when the vehicle is in motion. Also, the rotation speed sensor on the gearbox input shaft is often of a type which cannot detect speeds below a certain speed, which means that it is not the actual contact point which is detected, but rather the point at which the clutch is at a position where the gearbox input axle has reached a high enough rotation speed to be detectable by the speed sensor.

SUMMARY OF THE INVENTION

An object of the present invention is to propose a method for determining the contact point for a clutch which solves the above problem.

The method according to the invention has the advantage that the clutch's contact point, i.e. the clutch position at which contact between the engine and the gearbox occurs, can be determined while said first gearbox component is in rotation, so determining the contact point can be carried out without first having to halt said first gearbox component.

Further characteristics of the present invention and advantages thereof are indicated by the detailed description of examples of embodiments set out below and the attached drawings.

DETAILED DESCRIPTION OF EMBODIMENTS

Figure 1:
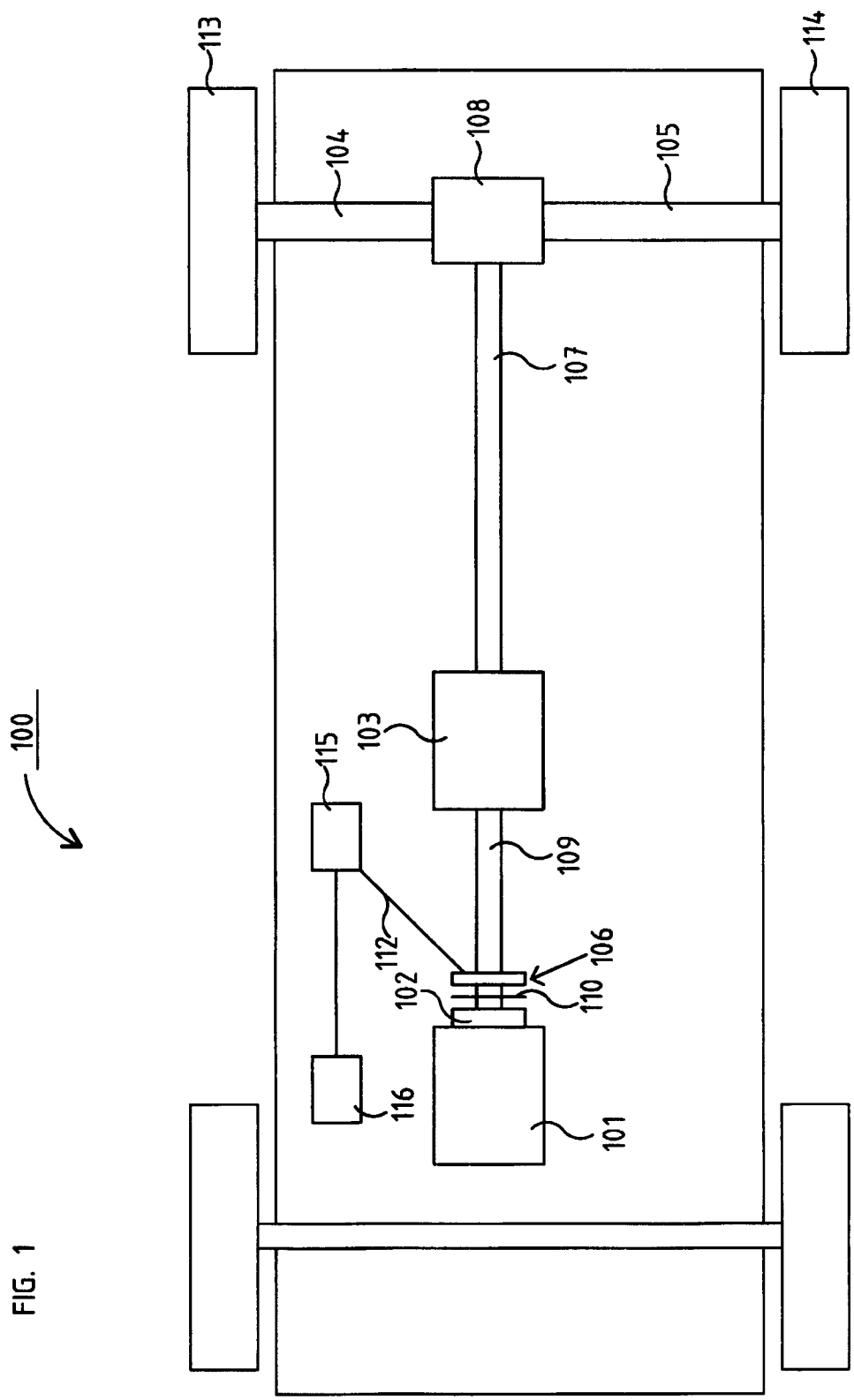
FIG. 1 depicts a power train in a vehicle with which the present invention may with advantage be used.

FIG. 1 illustrates a power train in a vehicle 100 according to an embodiment of the present invention. The vehicle illustrated schematically in FIG. 1 comprises only one axle with powered wheels 113, 114, but the invention is also applicable in vehicles where more than one axle is equipped with powered wheels. The power train comprises a combustion engine 101 which is connected in a conventional way via an output shaft of the engine 101, usually via a flywheel 102, to a gearbox 103 via a clutch 106.

The clutch 106 takes the form of an automatically controlled clutch of disc type whereby a friction element (disc) 110 connected to a first gearbox component, e.g. the input shaft 109 of the gearbox 103, engages selectively with the engine's flywheel 102 to transmit driving force from the combustion engine 101 to the powered wheels 113, 114 via the gearbox 103. The engagement of the clutch disc 110 with the engine's flywheel 102 is controlled by means of a pressure plate 111, which is movable sideways, e.g. by means of a lever 112, the function of which is controlled by a clutch actuator 115. The influence of the clutch actuator 115 upon the lever 112 is in turn controlled by the vehicle's control system 116.

Vehicle control systems in modern vehicles usually consist of a communication bus system consisting of one or more communication buses for connecting together a number of electronic control units (ECUs), or controllers, and various components located on the vehicle. A control system of this kind may comprise a large number of control units, and the responsibility for a specific function may be divided among two or more control units. For the sake of simplicity, FIG. 1 illustrates only one such control unit 116 which controls the clutch (the clutch actuator 115). In reality, the control of the clutch actuator 115 by the control unit 116 will for example probably depend on information received, e.g. from the control unit which is responsible for the function of the gearbox 103, and from the control unit/units that control engine functions.

The vehicle further comprises drive shafts 104, 105 which are connected to the vehicle's powered wheels 113, 114 and are driven by an output shaft 107 from the gearbox 103 via an axle gear 108, e.g. a conventional differential.

When a gear change is executed in the vehicle depicted in FIG. 1, the clutch is opened, the new gear is engaged and the clutch is then closed. As mentioned above, in the case of a gear change of this kind it is important that the vehicle's control system can recognise the clutch's contact point, i.e. the position at which the clutch disc comes into contact with the flywheel, and can therefore begin to transmit torque between the engine and the rest of the power train. The ability to recognise the contact point's position makes it possible for gear changes to be executed in a way which is both comfortable for the driver, e.g. by being free from unwanted jerking, while at the same time they can take place in a manner which does not stress the power train and hence reduces unnecessary power train wear. The gear change process when changing gear can also be speeded up in that the clutch need not be opened more than just past the contact point when changing gear, and hence not to the lever's full deflection.

In this description, the term "contact point" refers not only to the physical position at which the clutch disc is when it comes into physical contact with the flywheel (or some other element connected to the engine output shaft) but also to any desired representation of this contact point, thus making it possible for the contact point to be defined by, for example, the position of the lever and/or the clutch actuator when the clutch disc comes into contact with the flywheel.

Figure 2:
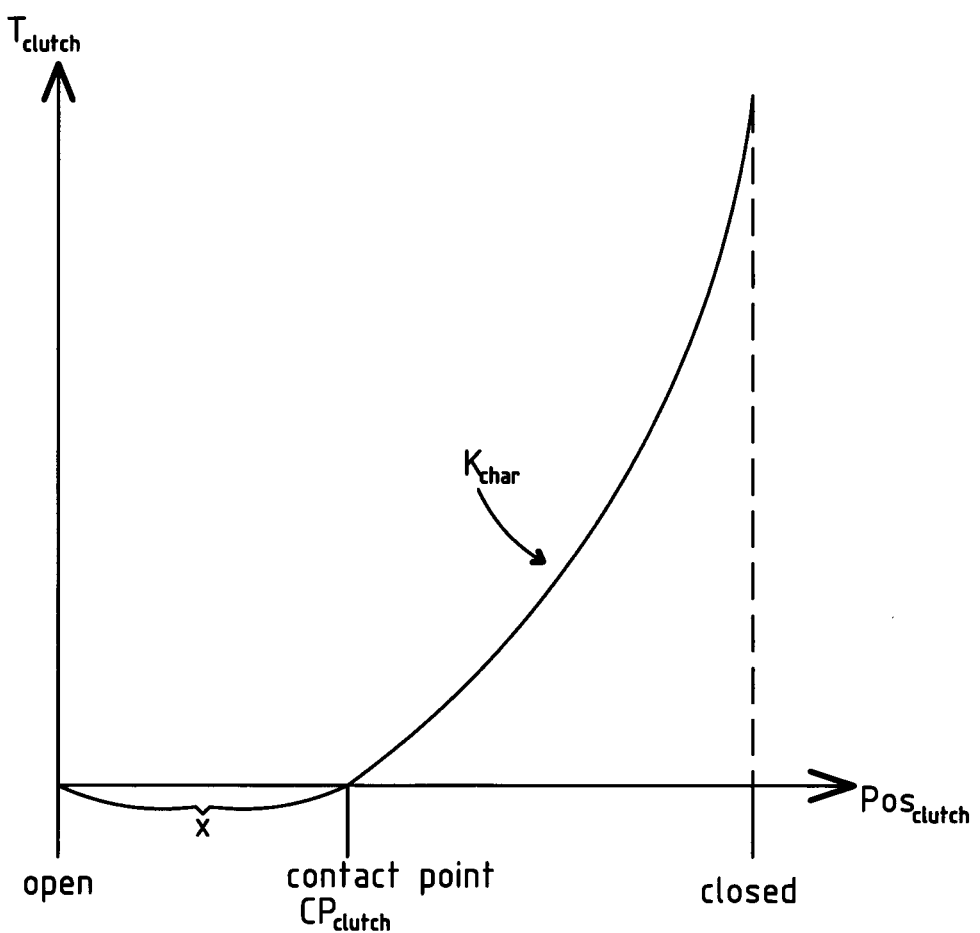
FIG. 2 depicts a characteristic for a clutch according to FIG. 1.

FIG. 2 is a diagram representing a characteristic for a clutch of the type depicted in FIG. 1. The y-axis represents the torque which the clutch can transmit between the engine and the power train, the x-axis represents the position of the clutch (or the clutch actuator), the origin represents the clutch open, i.e. the clutch disc (and hence the lever/clutch actuator) in one extreme position, and "closed" represents the position in FIG. 1 where the clutch disc is as far to the left as possible and the clutch (the lever/clutch actuator) is therefore in its other extreme position.

The clutch disc in an open position will normally be at a distance from the engine's flywheel, so closing the clutch will move the clutch disc a distance x before it actually comes into physical contact with the engine's flywheel. As soon as the clutch disc is in contact with the flywheel, torque transmission between the engine and the rest of the power train can begin. Thereafter, the more the clutch is closed (the harder the clutch disc engages frictionally with the flywheel), the more torque can be transmitted between the engine and the rest of the power train. Exactly how much torque can be transmitted at each point depends on the clutch characteristic $K_{char}$, which may vary from clutch to clutch and which, like the contact point, is both temperature-dependent and dependent on other factors, so the clutch characteristic also needs to be estimated at regular intervals. Estimation of the clutch characteristic is however not subject matter of the present invention and will therefore not be described in more detail here. There are various prior art examples of how this estimation can be carried out. Since the clutch's contact point $CP_{clutch}$ is temperature-dependent and the clutch's temperature varies when the vehicle is in motion, e.g. depending on how often gear changes are executed, the distance x will also vary when the vehicle is in motion.

Figure 3:
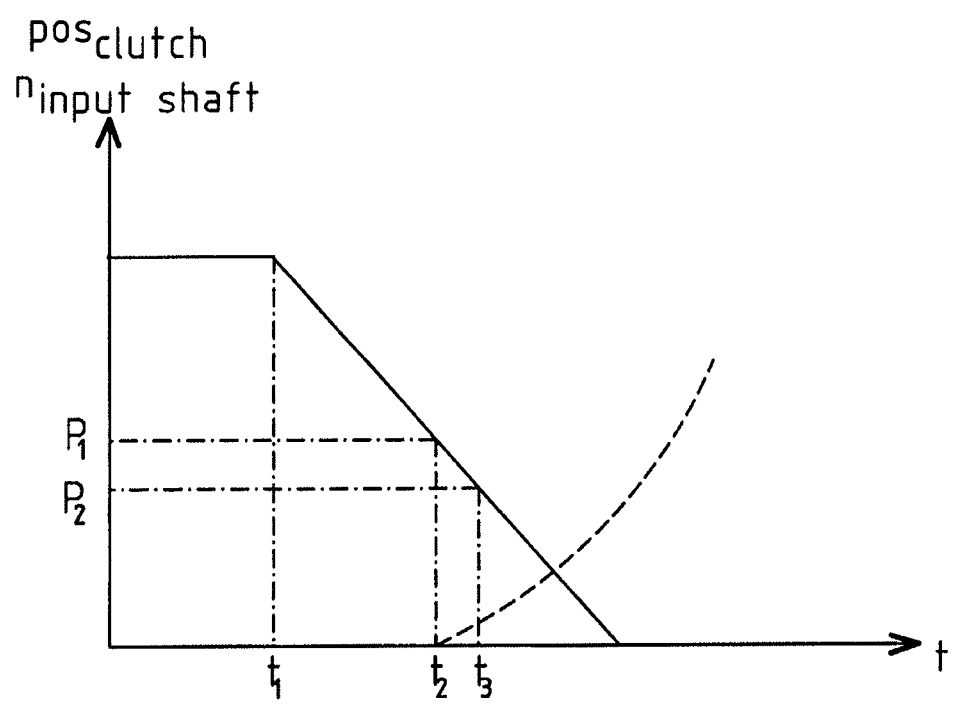
FIG. 3 depicts a characteristic for a clutch according to the state of the art.

FIG. 3 is a diagram of an example of contact point determination according to the state of the art. The x-axis represents time and the y-axis represents clutch position and rotation speed for said first gearbox component. The 0 position on the y-axis represents clutch closed. The broken line indicates the rotation speed for said first gearbox component, and the continuous line represents clutch position. As shown in the diagram, the contact point determination is initiated when said first gearbox component is stationary.

It may however take several seconds for this "initiating position" to be reached. For it to be possible for said first gearbox component (e.g. the gearbox input shaft, the clutch disc or the countershaft which is often present in the gearbox) to be halted when the vehicle is in motion, requires both the clutch to be opened and the gearbox to be placed in neutral position. When the clutch has been opened and the gearbox has been placed in neutral position, said first gearbox component rotates freely and will be braked by inherent friction until a stationary situation is reached.

This may however take many seconds, especially if the gearbox is warm from running, in which case there will normally be only slight friction. This process can in some vehicles be speeded up by equipping the countershaft, which is usually present in gearboxes of this kind and is usually connected to said input shaft, with a brake by means of which braking can also be applied to the gearbox input shaft. However, many vehicles do not have this facility.

When the gearbox input shaft is stationary, the contact point determination is initiated by starting to close the clutch at time $t_1$. At time $t_2$ the gearbox input shaft begins to rotate, so this clutch position $P_1$ represents the actual contact point. The rotation speed for the gearbox input shaft is usually determined by means of a speed sensor fitted to this shaft (or the countershaft). However, this rotation speed sensor is often of inductive (passive) type, which means that it cannot usually detect low speeds accurately, typically being unable to detect speeds below 50-100 rpm. This in turn means that the method is not able to detect the actual contact point $P_1$, but rather the point (position) which the clutch is at when the input shaft reaches a high enough speed to be detectable by the speed sensor. This is indicated by time $t_3$ in FIG. 3, which means therefore that the position $P_2$, rather than the position $P_1$, is incorrectly determined as the clutch's contact point.

The method shown therefore suffers both from the disadvantage that the position determined may be incorrect due to the rotation speed sensor not being sensitive enough, and that it can take a long time to carry out. Where no braking facilities are available from the countershaft, the determination cannot be carried out during a normal upshift/downshift, but usually only when the vehicle is stationary.

The present invention proposes a method for determining the contact point's position which can be carried out quickly irrespective of whether the gearbox countershaft has braking facilities or not, and which can determine the contact point in a situation where the first gearbox component's speed sensor normally exhibits greater accuracy.

Figure 4:
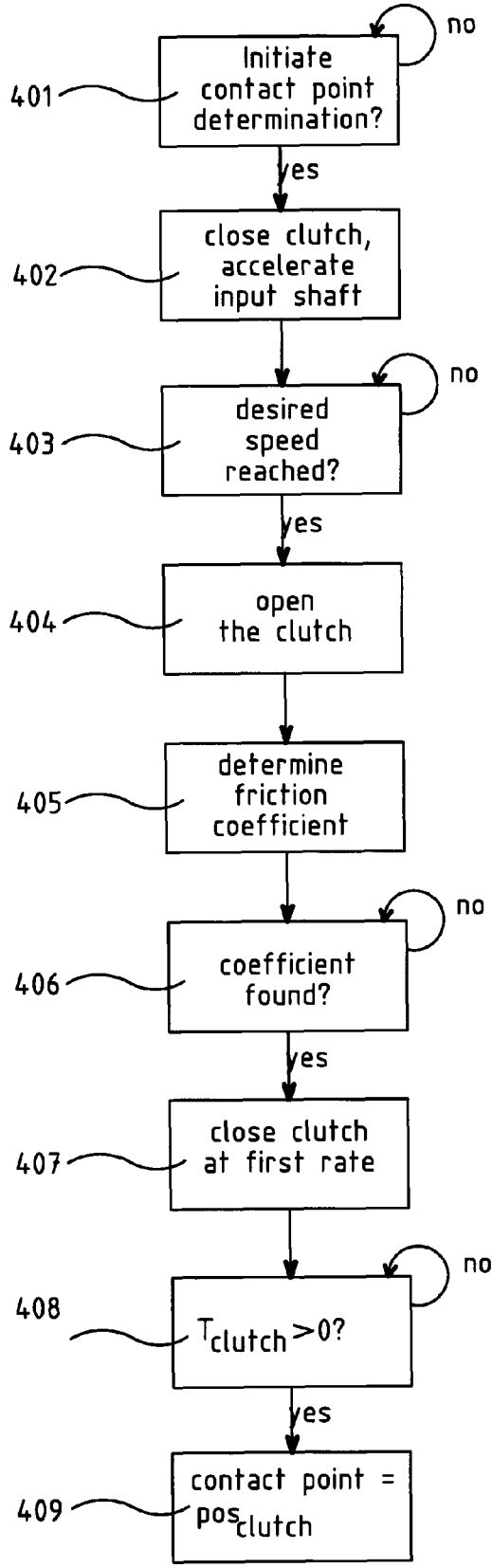
FIG. 4 depicts a method according to the present invention.

A method 400 according to the present invention is illustrated in FIG. 4. The method according to the invention begins at step 401, where it is established whether contact point determination is to be initiated, in which case the method moves on to step 402, where the clutch is closed to accelerate the gearbox input shaft by means of the engine output shaft. If necessary, the speed can be increased in this situation to speed up the gearbox input shaft (the first gearbox component). The gearbox needs to be placed in neutral position when the acceleration of the first gearbox component begins. The first gearbox component's actual rotation speed when the method according to the present invention begins is unimportant, the main requirement is a high enough speed to ensure that a correct determination can be carried out, which can for example be ensured by accelerating the first gearbox component until signals from the speed sensor indicate that the desired speed has been reached, step 403.

If the vehicle is rolling, the first gearbox component can alternatively be accelerated by first opening the clutch and then, by appropriate gear change in the gearbox, imparting to the first gearbox component the desired rotary motion, followed by placing the gearbox in neutral position.

When the gearbox input shaft has reached the desired speed as above and the clutch is open so that the clutch disc is not in contact with the flywheel, and the gearbox has been placed in neutral position, the first gearbox component's rotation speed will begin to decrease. According to the method according to the present invention, the friction coefficient is then calculated for the inherent friction for said first gearbox component (e.g. the gearbox input shaft, including clutch disc, or the gearbox input shaft or the countershaft).

Figure 5:
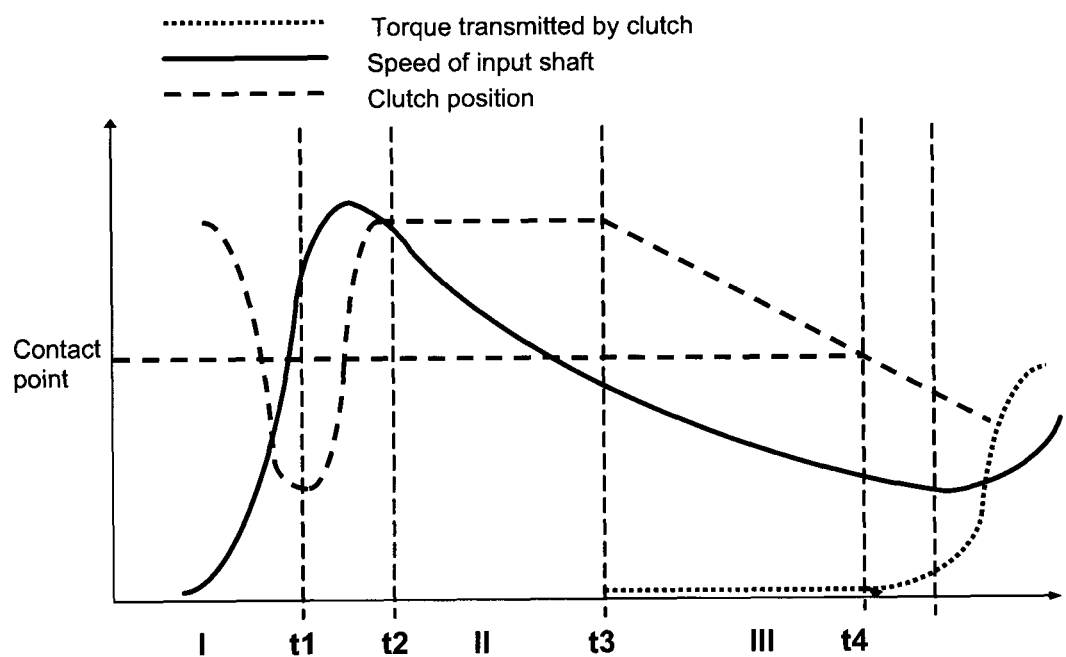
FIG. 5 is a schematic diagram of how the torque transmitted by a clutch changes during an estimation according to the present invention.

FIG. 5 illustrates schematically how the first gearbox component's rotation speed (continuous line), the torque transmitted by the clutch (dotted line) and the clutch position (broken line) change over time during an estimation according to the present invention. During period I the first gearbox component is accelerated by closure of the clutch so that at time t1 it reaches the desired rotation speed, whereupon the clutch is reopened. When the clutch has been opened, at time t2, the estimation according to the invention begins.

According to the laws of physics, after the disconnection and taking into account the inherent friction, the remaining torque acting upon the gearbox input shaft is defined as the moment of inertia multiplied by the acceleration.

Releasing the first gearbox component when the gearbox is in a free state results in $$T_{Clutch} - T_{Friction} = J\dot{\omega} \quad \text{equation (1)}$$

where $T_{Clutch}$ represents the torque transmitted by the clutch. $T_{Friction}$ is the friction torque acting upon the gearbox input shaft (the first gearbox component) and J denotes the first gearbox component's moment of inertia, which is a constant which can be determined before installation in the vehicle's power train. $\dot{\omega}$ is the input shaft's angular acceleration. The clutch's contact point is represented by the first point at which the torque transmitted by the clutch exceeds zero, i.e. $T_{Clutch}>0$, when the clutch (the clutch disc) moves from open position to closed position, i.e., as mentioned above, the contact point is represented by the clutch position at precisely the point when contact occurs between flywheel, disc and pressure plate.

Equation (1) may be re-formulated as $$T_{Clutch} = J\dot{\omega} + T_{Friction} \quad \text{equation (2)}$$

To calculate $T_{Clutch}$ according to (2), both $\dot{\omega}$ and $T_{Friction}$ have to be assessed.

$\dot{\omega}$ can be calculated from the rotation speed for the gearbox input shaft, e.g. by means of consecutive values of $\omega$ and/or by means of a derivative filter. When $\dot{\omega}$ has been determined, the angular acceleration may be considered constant.

As $T_{Friction}$ is different from zero, it also has to be catered for, see step 405 in FIG. 4, in order to be able to determine when $T_{Clutch}$ is greater than zero.

$T_{Friction}$ is typically not constant, but experimentation has shown that it behaves like a viscous friction in a linear relationship with the angular velocity i.e. $T_{Friction}$ may be formulated as $$T_{Friction} = k_{Friction}\omega \quad \text{equation (3)}$$

where $k_{Friction}$ is a friction constant and $\omega$ is the input shaft's angular velocity. To be able to utilise this relationship, $k_{Friction}$ has therefore to be assessed. The fact that $T_{Clutch}=0$ when the clutch is completely open is used to assess $k_{friction}$, which together with equations (1) and (3) results in $$k_{Friction} = -\frac{J\dot{\omega}}{\omega} \text{ when } T_{Clutch} = 0 \quad \text{equation (4)}$$

If the vehicle's (combustion) engine is started and the clutch in the initial position is closed while at the same time the gearbox is in neutral, the gearbox input shaft will have a rotation speed which corresponds to the engine speed. If the clutch is then opened completely, so that it cannot transmit any torque at all, and the first gearbox component is disconnected from the vehicle's flywheel, the input shaft's speed will decrease, due to its friction $T_{Friction}$ as above.

In this situation, i.e. period II between times t2 and t3 in FIG. 5, an estimation of $k_{Friction}$ is obtained by first determining the angular acceleration and then calculating equation (4) by means of that angular acceleration determination, and by determining the rotation speed by means of the speed sensor and known information about the input shaft's moment of inertia. It is preferable to perform multiple determinations of $k_{Friction}$ while the rotation speed of the gearbox input shaft is decreasing, in which case $k_{Friction}$ can for example be determined as an average of these determinations. Since $k_{Friction}$ may vary when the vehicle is in motion, e.g. due to gearbox temperature, carrying out a new determination of $k_{Friction}$ each time the clutch's contact point is to be assessed is of advantage.

With $T_{Friction}$ assessed according to equation (4) and equation (3), step 406 in FIG. 4, equation (2) can then be used to detect when $T_{Clutch}>0$. For example, the clutch position may be moved at an appropriate controlled rate from open to closed position, see period III in FIG. 5, step 407 in FIG. 4, while at the same time $T_{Clutch}$ is calculated by means of the above equations and the rotation speed from the speed sensor, and the contact point is determined, step 409 in FIG. 4, as the position the clutch was at when $T_{Clutch}>0$ for the first time, step 408 in FIG. 4. The closure of the clutch should take place while the first gearbox component is at a high enough speed for signals from the speed sensor to be reliable. If the speed of the first gearbox component has dropped to a level at which such is not the case, that component may initially be re-accelerated, e.g. by means of the clutch, so that reliable speed measurements are obtained. It is preferable to determine $T_{Clutch}$ more or less continuously at brief intervals during the closing process to ensure that as good an estimation as possible of the contact point is obtained. Determining $T_{Clutch}$ at too long intervals risks impairing the accuracy of the contact point.

FIG. 5 also illustrates how the calculated $T_{Clutch}$ changes when the clutch is closed in a controlled manner as above. As illustrated, $T_{Clutch}=0$ (for reasons of clarity, $T_{Clutch}$ is shown as a value somewhat above zero) up to time t4, at which the calculated $T_{Clutch}$ suddenly exceeds zero, and the contact point is then determined as the clutch position at that time. The contact point is defined above as the first position where $T_{Clutch}>0$. In practice, however, it may instead be advantageous to define the contact point as the position where $T_{Clutch}$ exceeds a threshold value, offset, in order for example to compensate for any disturbance which might otherwise result in incorrect determination of the contact point. By thereafter determining when $T_{Clutch}$ deviates from this threshold value, the contact point can still be determined with good precision.

So far a known value for the first gearbox component's moment of inertia J has been applied and $T_{Clutch}$ has been considered. Equation (2) can however be formulated as $$\frac{T_{Clutch}}{J} = \dot{\omega} + \frac{T_{Friction}}{J} \quad \text{equation (5)}$$

whereby J will be incorporated in the determination of the friction torque and $$\frac{T_{Clutch}}{J}$$

will be considered instead of $T_{Clutch}$.

In this case, no specific knowledge of J is therefore required. In the present description and claims, however, $$\frac{T_{Clutch}}{J},$$

like other similar reformulations, is a representation of the torque transmitted by the clutch.

To sum up, the present invention therefore has the advantage that determination of the contact point can be carried out without the gearbox input shaft having to be halted, i.e. no time is spent waiting for this to happen. The invention also has the advantage that the determination can be carried out at rotation speeds of the gearbox input shaft at which its speed sensor functions properly and delivers reliable measured values. The invention also means that the contact point can also be determined when changing gear (or at least during certain gear changes, such as those involving large gear steps, or during slow gear changes, e.g. on a downgrade, or by the control system deliberately executing a slower gear change) and also when the clutch is opened upon braking to standstill.

The first gearbox component has been described above as the gearbox input shaft or as the combination of the gearbox input shaft and the gearbox countershaft (and the clutch disc). The first gearbox component according to the present invention may be any desired combination of components, providing that they can be rotated by means of the clutch, and providing that they can be disconnected both from the vehicle's engine and from its powered wheels as above, i.e. it will be a power train component which can be disconnected both from the engine and from the flywheel. The friction torque assessed as above is therefore the friction torque for the combination of components.

The invention claimed is:

1. A method for determining a contact point for a clutch in a vehicle;
    wherein the vehicle comprises at least one powered wheel, a vehicle engine for generation of driving force for transmission to the at least one powered wheel via a clutch and a gearbox between the engine and the at least one powered wheel, the gearbox comprising at least one rotatable first gearbox component, and the clutch is selectively in a closed position connecting the engine to the at least one powered wheel or in an open position disconnecting the engine from the at least one powered wheel;
    the method comprising the steps of:
    accelerating the first gearbox component if the rotation speed of the first gearbox component is below a second value;
estimating a friction torque for the at least one first gearbox component when the at least one first gearbox component is disconnected from the at least one powered wheel, when the clutch is in an open position thereof and when the rotatable first gearbox component is rotating;
    closing the clutch from the open position when the at least one first gearbox component is disconnected from the powered wheel and the first gearbox component is rotating, wherein at the closure of the clutch, determining a representation of a torque transmitted by the clutch for a plurality of positions for the clutch, whereby the torque transmitted by the clutch is a function of the estimated friction torque;
    determining the contact point by means of the determined representation of the transmitted torque; and
    wherein the friction torque estimation is according to $T_{Friction}=k_{Friction}\omega$, where $k_{Friction}=-J\dot{\omega}/\omega$ and where $\omega$ and $\dot{\omega}$ respectively represent the angular velocity and the angular acceleration for the first gearbox component.

2. A method according to claim 1, comprising the further step of determining the position of the clutch when the torque transmitted by the clutch exceeds a first value, whereupon the position of the clutch determined represents the contact point.

3. A method according to claim 2, wherein the first value is substantially zero.

4. A method according to claim 1, further comprising during the estimation of the friction torque, performing a plurality of estimations whereby the estimation of the friction torque is based on the plurality of estimations.

5. A method according to claim 1, wherein calculating $\dot{\omega}$ is by a determination of $\omega$ for the first gearbox component at consecutive points in time and/or by means of a derivative filter.

6. A method according to claim 1, further comprising the closing of the clutch occurs at a substantially constant rate.

7. A method according to claim 1, further comprising determining the representation of the torque transmitted by the clutch continuously, at selected intervals, at selected times or for predetermined clutch positions.

8. A computer program product comprising a non-transitory computer-readable medium and a computer program code contained in the computer-readable medium, wherein when the computer program code is executed in a computer, the program code causes the computer to perform the method according to claim 1.

9. A system for determining the contact point for a clutch in a vehicle, wherein the vehicle comprises an engine for generation of driving force for transmission to at least one powered wheel via a clutch and a gearbox between the engine and the at least one powered wheel, the gearbox comprising at least one rotatable first gearing component, and the clutch is selectively in a closed position connecting the engine to the at least one powered wheel or in an open position disconnecting the engine from the at least one powered wheel;

the system is further configured and operable for accelerating the first gearbox component if the rotation speed of the first gearbox component is below a second value;

the system is configured and operable for estimating a friction torque for the at least one first gearbox component when the at least one first gearbox component is disconnected from the at least one powered wheel, when the clutch is in an open position thereof and when the first gearbox component is rotating;

the system is configured and operable for closing the clutch from the open position when the at least one first gearbox component is disconnected from the powered wheel and when the first gearbox component is rotating, wherein at the closure of the clutch, the system determines a representation of a torque transmitted by the clutch for a plurality of positions for the clutch, whereby the torque transmitted by the clutch is a function of the estimated friction torque;

the system is configured and operable for determining the contact point by means of the determined representation of the torque transmitted; and wherein the friction torque estimation is according to $$T_{Friction} = k_{Friction}\omega, \text{ where } k_{Friction} = -\frac{J\dot{\omega}}{\omega}$$

and where $\omega$ and $\dot{\omega}$ respectively represent the angular velocity and the angular acceleration for the first gearbox component.

10. A vehicle comprising a system for determining the contact point for a clutch in a vehicle, wherein the vehicle comprises an engine for generation of driving force for transmission to at least one powered wheel via a clutch and a gearbox between the engine and the at least one powered wheel, the gearbox comprising at least one rotatable first gearing component, and the clutch is selectively in a closed position connecting the engine to the at least one powered wheel or in an open position disconnecting the engine from the at least one from the powered wheel;

the system is further configured and operable for accelerating the first gearbox component if the rotation speed of the first gearbox component is below a second value;

the system is configured and operable for estimating a friction torque for the at least one first gearbox component when the at least one first gearbox component is disconnected from the at least one powered wheel, when the clutch is in an open position thereof and when the first gearbox component is rotating;

the system is configured and operable for closing the clutch from the open position when the at least one first gearbox component is disconnected from the powered wheel and when the first gearbox component is rotating, wherein at the closure of the clutch, the system is configured to determine a representation of a torque transmitted by the clutch for a plurality of positions for the clutch, whereby the torque transmitted by the clutch is a function of the estimated friction torque;

the system is configured and operable for determining the contact point by means of the determined representation of the torque transmitted; and wherein the friction torque estimation is according to $$T_{Friction} = k_{Friction}\omega, \text{ where } k_{Friction} = -\frac{J\dot{\omega}}{\omega}$$

and where $\omega$ and $\dot{\omega}$ respectively represent the angular velocity and the angular acceleration for the first gearbox component.

* * * * *